United States Patent
Moon et al.

(10) Patent No.: US 12,271,766 B2
(45) Date of Patent: Apr. 8, 2025

(54) APPARATUS FOR MONITORING TASK EXECUTION TIME AND METHOD OF OPERATING NODE

(71) Applicant: Hyundai AutoEver Corp., Seoul (KR)

(72) Inventors: Doo Hyun Moon, Seoul (KR); Keon Woo Lee, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 768 days.

(21) Appl. No.: 17/519,987

(22) Filed: Nov. 5, 2021

(65) Prior Publication Data
US 2022/0188176 A1 Jun. 16, 2022

(30) Foreign Application Priority Data
Dec. 15, 2020 (KR) .................. 10-2020-0175367

(51) Int. Cl.
*G06F 9/52* (2006.01)
*G06F 11/30* (2006.01)
*G06F 11/34* (2006.01)

(52) U.S. Cl.
CPC ............ *G06F 9/52* (2013.01); *G06F 11/3024* (2013.01); *G06F 11/3419* (2013.01)

(58) Field of Classification Search
CPC .... G06F 9/52; G06F 11/3024; G06F 11/3419; G06F 2201/86; G06F 11/302; G06F 9/4881; G06F 9/4887; G06F 9/485; G06F 9/30087; G06F 11/1004; G06F 11/3612
See application file for complete search history.

(56) References Cited

U.S. PATENT DOCUMENTS

| | | | |
|---|---|---|---|
| 10,176,015 B2* | 1/2019 | Li | G06F 11/323 |
| 2008/0273527 A1* | 11/2008 | Short | H04L 12/40182 |
| | | | 370/364 |
| 2012/0089814 A1* | 4/2012 | Gupta | G06F 9/4405 |
| | | | 712/30 |
| 2015/0277801 A1* | 10/2015 | Konishi | G06F 3/0665 |
| | | | 711/114 |
| 2016/0182284 A1* | 6/2016 | Ayanam | G06F 9/45558 |
| | | | 709/222 |
| 2020/0177486 A1* | 6/2020 | Bisht | H04L 41/083 |
| 2020/0183809 A1* | 6/2020 | Kwak | G06F 9/5022 |

FOREIGN PATENT DOCUMENTS

| | | |
|---|---|---|
| JP | 2003-084991 A | 3/2003 |
| KR | 10-2018-0033761 A | 4/2018 |
| KR | 10-1928349 B1 | 12/2018 |

\* cited by examiner

*Primary Examiner* — Jorge A Chu Joy-Davila
(74) *Attorney, Agent, or Firm* — Bridgeway IP Law Group, PLLC; Jihun Kim

(57) ABSTRACT

Proposed is a monitoring apparatus for monitoring a task execution time, the monitoring apparatus including: a setting device configured to output setting information for setting a storage position at which task operation information is to be stored in each of a plurality of nodes, a size of a memory structure, or the number of memory structures; and a task monitor configured to output a task operation information request signal to each of the plurality of nodes, and receive the task operation information from each of the plurality of nodes.

12 Claims, 5 Drawing Sheets

| | 10769.1 | 10769.11 | 10770.1 | 10770.2 | |
|---|---|---|---|---|---|
| NODE 1 | TASK 1 | | | | ... |
| NODE 2 | | | TASK 2 | | ... |

FIG. 2

| PROTOCOL VISION | MAGIC BYTE | DATA LENGTH | CRC | DATA | | | |
|---|---|---|---|---|---|---|---|
| | | | | STORAGE POSITION | MAXIMUM SIZE | MAXIMUM NUMBER | PRELIMINARY |
| 2 BYTES | 2 BYTES | 4 BYTES | 2 BYTES | 4 BYTES | 4 BYTES | 4 BYTES | 10 BYTES |

32 BYTES

FIG. 3

APPARATUS FOR MONITORING TASK EXECUTION TIME AND METHOD OF OPERATING NODE

CROSS-REFERENCE TO RELATED APPLICATIONS

This application claims priority to and the benefit of Korean Patent Application No. 10-2020-0175367 filed in the Korean Intellectual Property Office on Dec. 15, 2020, the entire contents of which are incorporated herein by reference.

TECHNICAL FIELD

The present invention relates to an apparatus for monitoring a task execution time and a method of operating a node.

BACKGROUND ART

In general, a Real Time Operating System (RTOS) is an operating system developed for a real-time application program, and is designed with a focus on Central Processing Unit (CPU) time management. The basic design method is divided into an event-driven method and a time-sharing scheduling method. The event-driven method is called priority-based scheduling or preemptive scheduling, and task switching is used when an event having a higher priority than a task that is currently being performed requests a service. The time-sharing scheduling method performs switching of a task when a periodical event, such as clock interrupt or round robin, occurs. The core of the RTOS is to keep the test processing time of an application program consistent.

PRIOR ART LITERATURE

Patent Document (Patent Document 1) Korean Patent: 10-1928349 (registered on Dec. 6, 2018) entitled Apparatus and Method of Monitoring Task Execution Time of Real-Time Operating System

SUMMARY OF THE INVENTION

The present invention has been made in an effort to provide an apparatus for monitoring a task execution time which monitors a synchronization operation and efficiently uses a memory, and a method of operating a node.

An exemplary embodiment of the present invention provides a monitoring apparatus for monitoring a task execution time, the monitoring apparatus including: a setting device configured to output setting information for setting a storage position at which task operation information is to be stored in each of a plurality of nodes, a size of a memory structure, or the number of memory structures; and a task monitor configured to output a task operation information request signal to each of the plurality of nodes, and receive the task operation information from each of the plurality of nodes.

In the exemplary embodiment, the task operation information may include a start time and an end time of a task measured at a corresponding node, and the start time and the end time may include a synchronization time and a local time, respectively.

In the exemplary embodiment, the synchronization time may be output from a time synchronizing device for checking a synchronization operation of tasks of different nodes.

In the exemplary embodiment, the local time may be an operation time after the corresponding node is booted.

In the exemplary embodiment, the storage position may be set to any one of a volatile memory and a non-volatile memory.

In the exemplary embodiment, the setting information may include protocol version information, magic byte information, data length information, Cyclic Redundancy Check (CRC) information, and setting data, and the setting data may include storage position information, maximum storage size information, maximum storage number information, and preliminary information.

In the exemplary embodiment, the task monitor may calculate a task execution time based on the task operation information from each of the plurality of nodes and output the calculated task execution time on a screen.

Another exemplary embodiment of the present invention provides a method of operating a node in a task execution monitoring system, the method including: receiving setting information from a monitoring apparatus; collecting task operation information; determining whether a size of the task operation information exceeds a first reference value of the setting information; when the size of the task operation information is larger than the first reference value, determining whether the number of task operation information exceeds a second reference value of the setting information; when the number of task operation information does not exceed the second reference value, newly generating the task operation information; and; storing the generated task operation information at a storage position of the setting information, in which the task operation information may include a start time and an end time of a task measured at a corresponding node and the start time and the end time may include a synchronization time and a local time, respectively.

In the exemplary embodiment, the method may further include when the size of the task operation information is not larger than the first reference value, storing the collected task operation information at the storage position.

In the exemplary embodiment, the method may further include when the number of task operation information is larger than the second reference value, deleting old task operation information.

In the exemplary embodiment, the setting information may include protocol version information, magic byte information, data length information, Cyclic Redundancy Check (CRC) information, and setting data, and the setting data may include storage position information, maximum storage size information corresponding to the first reference value, maximum storage number information corresponding to the second reference value, and preliminary information.

Still another exemplary embodiment of the present invention provides a method of operating a node in a task execution monitoring system, the method including: initializing a monitoring apparatus and a communication channel; receiving setting data from the monitoring apparatus; determining whether the received setting data is valid; when the received setting data is valid, determining whether setting data stored in a storing device is the same as the received setting data; when the setting data stored in the storing device is not the same as the received setting data, updating the received setting data in the storing device; and updating the setting data of the node, in which the setting data may include storage position information, size information about task operation information, and information on the number of task operation information.

In the exemplary embodiment, the determining whether the received setting data is valid may include checking validity of the received setting data by using protocol version information, magic byte information, data length information, and Cyclic Redundancy Check (CRC) information of a header of the setting data.

In the exemplary embodiment, the method may further include waiting for reception of the setting data.

In the exemplary embodiment, the method may further include when the received setting data is not valid, entering the operation of waiting for the reception of the setting data.

In the exemplary embodiment, the method may further include when the setting data stored in the storing device is the same as the received setting data, not-updating the received setting data.

The task execution time monitoring apparatus and the operating method of the node according to the exemplary embodiment of the present invention may monitor a system synchronization operation operated in each node by adding a synchronization time to a monitoring reference time.

The task execution time monitoring apparatus and the operating method of the node according to the exemplary embodiment of the present invention may efficiently use a volatile/non-volatile memory of each node by limiting the size and the number of memory structures of task operation information.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings below are for helping to understand the present exemplary embodiment, and exemplary embodiments are provided together with the detailed description. However, a technical characteristic of the present exemplary embodiment is not limited to a specific drawing, and the characteristics disclosed in the drawings may be combined with each other to be configured as a new embodiment.

FIG. 2 is a diagram illustrating an example of a result of monitoring task operations of different nodes with start/end times based on synchronization time according to the exemplary embodiment of the present invention.

FIG. 3 is a diagram illustrating an example of a transmission data protocol between a setting device 210 of a monitoring apparatus 200 and a storing device of a node according to the exemplary embodiment of the present invention.

Figure 1:
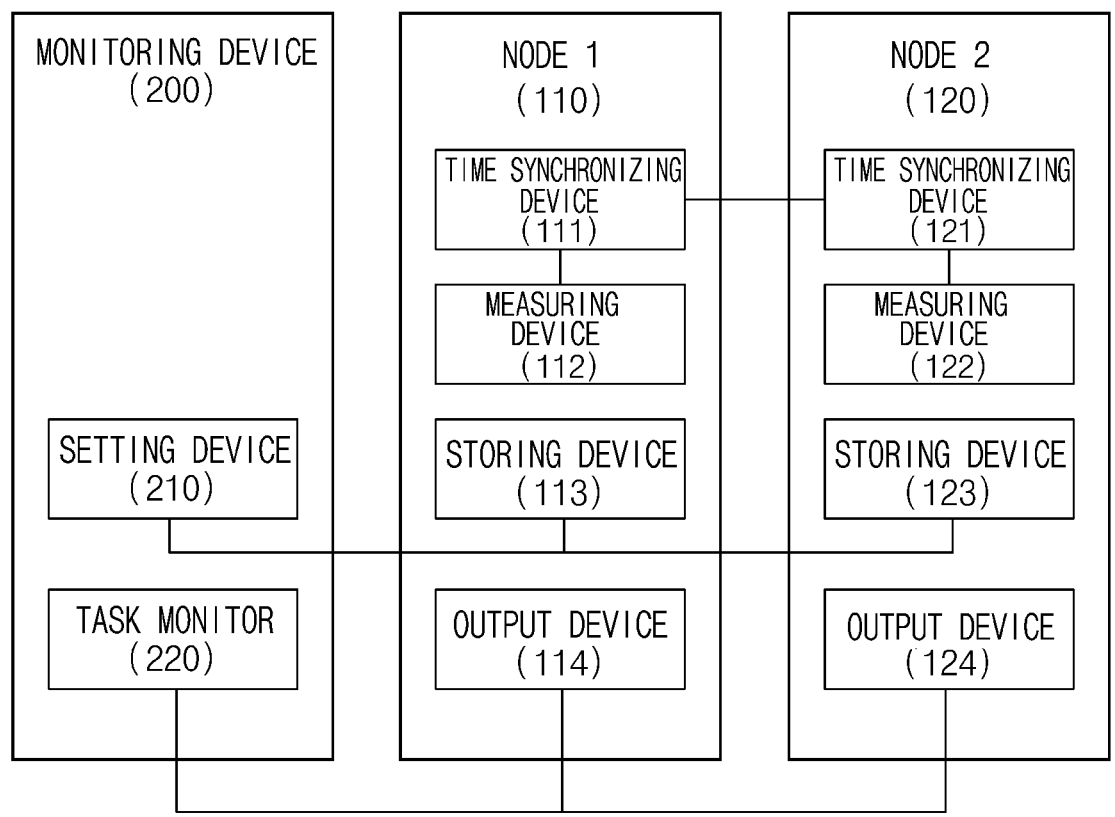
FIG. 1 is a diagram illustrating an example of a task execution time monitoring system 10 according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the contents of the present invention will be described clearly and in detail so that those skilled in the art can easily implement the present invention by using the drawings.

Since the present invention may be variously changed and have various forms, specific exemplary embodiments are illustrated in the drawings and described in detail in the text. However, it is not intended to limit the present invention to the specific disclosed form, and it will be appreciated that the present invention includes all modifications, equivalences, or substitutions included in the spirit and the technical scope of the present invention. Terms, such as first and second, may be used for describing various constituent elements, but the constituent elements are not limited by the terms.

The terms are used only to discriminate one constituent element from another constituent element. For example, without departing from the scope of the present invention, a first constituent element may be named as a second constituent element, and similarly a second constituent element may also be named as a first constituent element. It should be understood that when one constituent element is referred to as being "coupled to" or "connected to" another constituent element, one constituent element can be directly coupled to or connected to the other constituent element, but intervening elements may also be present. By contrast, when one constituent element is referred to as being "directly coupled to" or "directly connected to" another constituent element, it should be understood that there are no intervening elements.

Other expressions, that is, "between . . . " and "just between . . . " or "adjacent to . . . " and "directly adjacent to . . . " explaining a relationship between constituent elements, should be interpreted in a similar manner. Terms used in the present application are used only to describe specific exemplary embodiments, and are not intended to limit the present invention. Singular expressions used herein include plurals expressions unless they have definitely opposite meanings in the context.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance. All terms used herein including technical or scientific terms have the same meanings as meanings which are generally understood by those skilled in the art unless they are differently defined. Terms defined in generally used dictionary shall be construed that they have meanings matching those in the context of a related art, and shall not be construed in ideal or excessively formal meanings unless they are clearly defined in the present application.

FIG. 1 is a diagram illustrating an example of a task execution time monitoring system 10 according to an exemplary embodiment of the present invention. Referring to FIG. 1, a task execution time monitoring system 10 may include a plurality of nodes 110 and 120, and a monitoring apparatus 200. For convenience of description, FIG. 1 illustrates only two nodes. However, the number of nodes of the present invention is not limited thereto.

The task execution time monitoring system 10 may be implemented so as to transmit task operation information data to the monitoring apparatus 200 by measuring a task execution time.

The first node 110 may include a time synchronizing device 111, a measuring device 112, a storing device 113, and an output device 114.

The time synchronizing device 111 may be implemented to synchronize a time of the first node 110 to the same reference time.

The measuring device 112 may be implemented so as to measure an operation time of the task by storing a start time and an end time of a task. For example, the measuring device 112 may be implemented so as to measure a start time and an end time to be measured as a local time and a synchronization time. Herein, the local time may be the time to know an operation time after booting, and the synchronization time may be a time transmitted from the time synchronizing device 111. That is, the synchronization time may be used for checking the operation time of the task after a target is booted. Further, the synchronization time may be used for checking whether the plurality of nodes is operated in accordance with the synchronization.

The storing device 113 may be implemented so as to store the task operation information received from the measuring device 114 in a memory (volatile or non-volatile memory). In the exemplary embodiment, the storing device 113 may be implemented so as to efficiently store task execution time data in a memory of a finite target. Further, the storing device 113 may be implemented so as to set a storage position (volatile/non-volatile) in which the measurement data is to be stored by the setting device 210. Further, the storing device 113 may be implemented so as to set the largest size of a memory structure to be stored by the setting device 210. Further, the storing device 113 may be implemented so as to set the largest number of memory structures to be stored by the setting device 210. In the exemplary embodiment, when the number of memory structures exceeds the number of memory structures set by the setting device 210 of the monitoring apparatus 200, the oldest memory structure may be deleted.

The output device 114 may be implemented so as to receive a task operation information request for the start time and the end time corresponding to the task execution of the first node 110 from a task monitor 220, and output the task operation information to the task monitor 220.

The second node 120 may include a time synchronizing device 121, a measuring device 122, a storing device 123, and an output device 124. Each of the time synchronizing device 121, the measuring device 122, the storing device 123, and the output device 124 may be implemented identically to that of the first node 110.

The monitoring apparatus 200 may include a setting device 210 and a task monitor 220.

The setting device 210 may be implemented so as to set a measurement data storage position of each node, set the largest size of a memory structure of each node, or set the largest number of memory structures of each node. Further, the setting device 210 may check a current setting state by acquiring setting data (storage position information, the size of the memory structure, the number of memory structures, and the like) of the storing device of each node.

The task monitor 220 may be implemented to transmit a task operation information request required for executing a task to each of the nodes 110 and 120, and receive task operation information from each of the nodes 110 and 120.

The task execution time monitoring system 10 according to the exemplary embodiment of the present invention may monitor a synchronization operation of a system in which each of the nodes 110 and 120 synchronizes and operates by adding a synchronization time to a monitoring reference time. Further, the task execution time monitoring system 10 according to the exemplary embodiment of the present invention may efficiently use the volatile/non-volatile memory of the node by limiting the size and the number of memory structures in which the task information is to be stored.

TABLE 1

| | Task identifier | Local time | | Synchronization time | |
|---|---|---|---|---|---|
| | | Start time | End time | Start time | End time |
| Node 1 | Task 1 | 0.0572 | 0.08198 | 10769.100112831 | 10769.11009001 |
| Node 2 | Task 2 | 12.11568 | 12.12565 | 10770.1 | 10770.2 |

Referring to Table 1, an example of task operation information collected by the measuring device of each node is represented. A task identifier is a unique identifier between all of the nodes. The start/end time of the task expressed with the local time is information for checking an operation time of the task operated in the node after booting. The start/end time of the task expressed with the synchronization time is information for checking a synchronization operation state with a task of another node.

FIG. 2 is a diagram illustrating an example of a result of monitoring task operations of different nodes with start/end times based on synchronization time according to the exemplary embodiment of the present invention.

In node 1, a first task starts at a synchronization time of 10769.1 and ends at a synchronization time of 10769.11. In node 2, a second task starts at a synchronization time of 10770.1 and ends at a synchronization time of 10770.2.

FIG. 3 is a diagram illustrating an example of a transmission data protocol between the setting device 210 of the monitoring apparatus 200 and the storing device of the node according to the exemplary embodiment of the present invention.

Referring to FIG. 3, monitoring setting information may include a protocol version information, magic byte information, data length information, Cyclic Redundancy Check (CRC) information, and setting data. In the exemplary embodiment, a size of the monitoring setting information may be 32 bytes. In the meantime, the size of the monitoring setting information of the present invention is not limited thereto.

The protocol version information is a field for checking a transmission protocol version. In the exemplary embodiment, the size of the protocol version information may be 2 bytes.

The magic byte information is a field for examining protocol data validation. In the exemplary embodiment, the size of the magic byte information may be 2 bytes.

The data length information is a field for representing a size of a data field. In the exemplary embodiment, the size of the data length information may be 4 bytes.

The CRC information is a CRC field for examining validation of a data field. In the exemplary embodiment, the size of the CRC information may be 2 bytes.

The setting data may include storage position information, maximum storage size information, maximum storage number information, and preliminary information.

The storage position information may be information notifying a storage position of the task operation information. For example, the storage position information may include information notifying whether the storage position is a Random Access Memory (RAM) region or a Non-Volatile Memory (NVM) region. In the exemplary embodiment, the size of the storage position information may be 4 bytes.

The maximum storage size information is information for notifying a maximum data size of the task operation information. In the exemplary embodiment, the size of the maximum storage size information may be 4 bytes.

The maximum storage number information may be information notifying the maximum number of task operation information. In the exemplary embodiment, the size of the maximum storage number information may be 4 bytes.

The preliminary information is the region for data of a setting device which is to be added later. In the exemplary embodiment, the size of the preliminary information may be 10 bytes.

Figure 4:
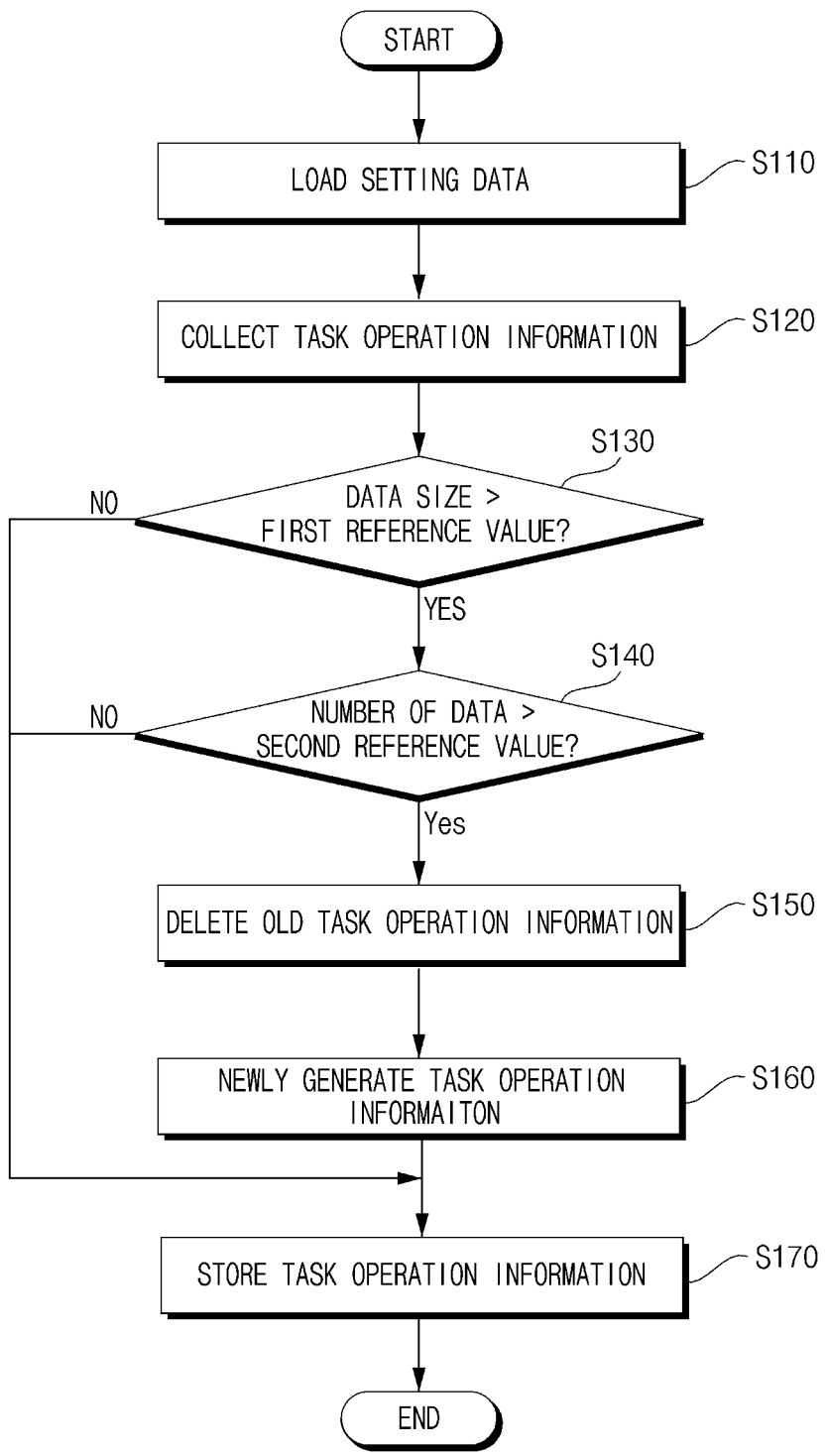
FIG. 4 is a flowchart illustrating an example of a method of storing a task operation information in a node according to the exemplary embodiment of the present invention.

FIG. 4 is a flowchart illustrating an example of a method of storing a task operation information in a node according to the exemplary embodiment of the present invention. Referring to FIGS. 1 to 4, the task operation information may be stored as described below.

Setting data for the corresponding node may be loaded from the setting device 210 of the monitoring apparatus 200 (S110). Task operation information may be collected in the node (S120). Herein, the task operation information may include a local time and a synchronization time for a start/end time of the task operation.

Whether a data size of the task operation information is larger than a first reference value may be determined (S130). Herein, the first reference value may be obtained from maximum storage size information of the setting data transmitted from the setting device 210 of the monitoring apparatus 200.

When the size of the data is larger than the first reference value, whether the number of task operation information is larger than a second reference value may be determined (S140). Herein, the second reference may be obtained from the information on the maximum storage number information of the setting data transmitted from the setting device 210 of the monitoring apparatus 200. When the number of task operation information is larger than the second reference value, old task operation information may be deleted (S150). Thereafter, task operation information may be generated (S160).

The task operation information may be stored in the storing device of the node when the size of the data is not larger than the first reference value in operation S130, or when the number of task operation information is not larger than the second reference value in operation S140, or after operation S160 (S170).

Figure 5:
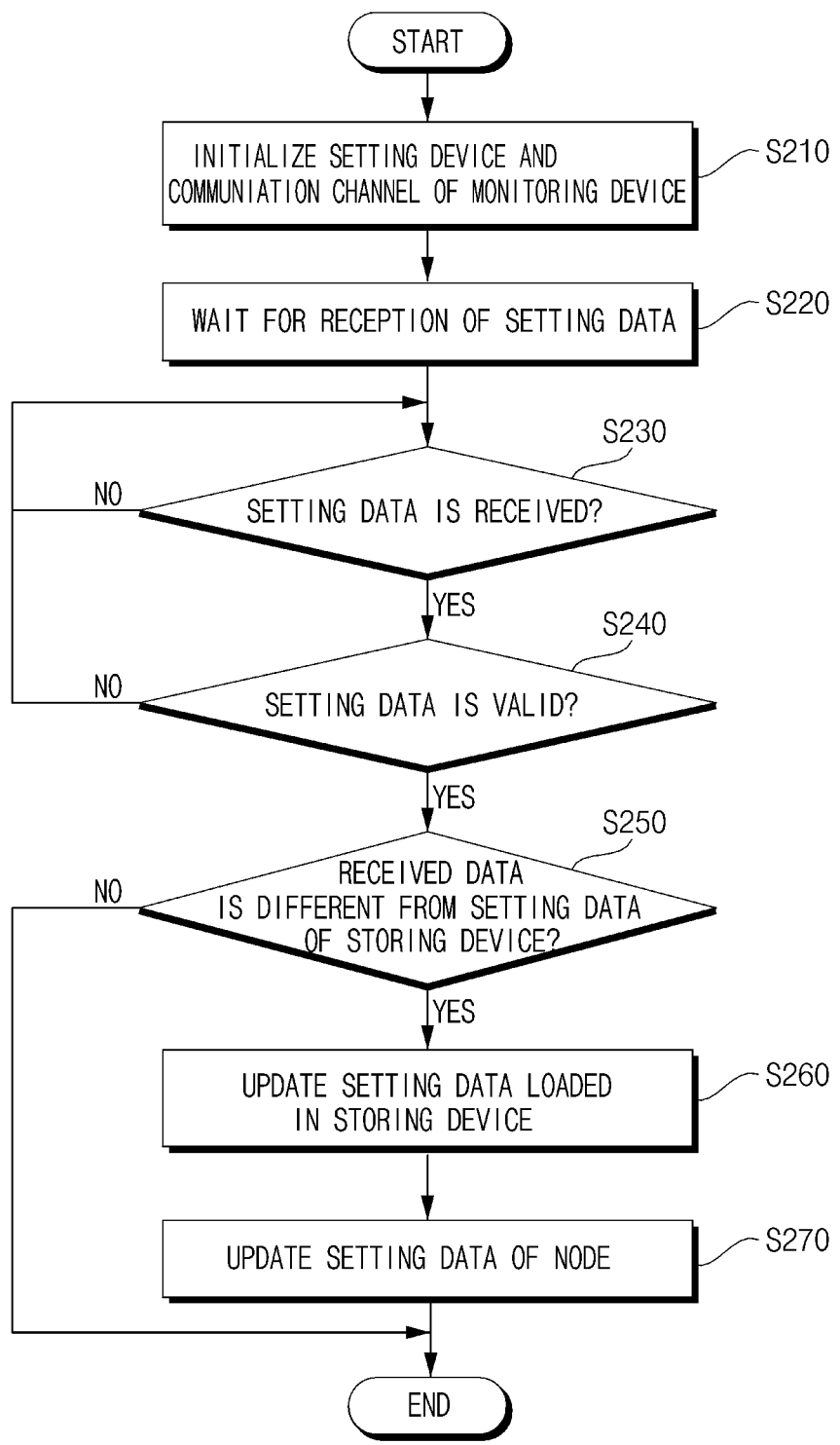
FIG. 5 is a flowchart illustrating a setting data updating process of a node according to the exemplary embodiment of the present invention.

FIG. 5 is a flowchart illustrating a setting data updating process of a node according to the exemplary embodiment of the present invention. Referring to FIGS. 1 to 5, a setting data updating process of the storing device of the node may progress as follows.

The setting device 210 of the monitoring apparatus 200 and a communication channel may be initiated (S210). It should be understood that the method of the channel for updating the setting data of the monitoring apparatus 200 and the node is not limited. In the exemplary embodiment, all of the channels that can communicate between the node and the monitoring apparatus (for example, UART and Ethernet) may be supported.

Reception of the setting data may be queued (S220). Whether the setting data is received may be determined (S230). When the setting data is received in operation S230, whether the received setting data is valid may be determined (S240). In the exemplary embodiment, the validity of the setting data received from the monitoring apparatus may be checked through the protocol version, the magic bytes, the data length, and CRC of the header of the setting data illustrated in FIG. 3. When the setting data is not received in operation S230, operation S220 may progress.

When the setting data is valid in operation S240, whether the setting data of the storing device is different from the received setting data may be determined (S250). After the setting data is received from the monitoring apparatus, in order to prevent an unnecessary update, the setting data which has been stored in the node and loaded in the storing device may be compared with the setting data received from the monitoring apparatus, and only when the setting data which has been stored in the node and loaded in the storing device is different from the setting data received from the monitoring apparatus as a result of the comparison, the update may progress. In the meantime, when the setting data is not valid in operation S240, operation S220 may progress.

When the setting data of the storing device is different from the received setting data, the setting data loaded in the storing device may be updated (S260). Then, the setting data of the node may be updated (S270). In the meantime, when the setting data of the storing device is the same as the received setting data in operation S260 or after operation S270, the setting data updating operation may be completed.

The steps and/or operations according to the present invention may be performed in a different order, or in parallel, or concurrently in different exemplary embodiments for different epochs and the like as would be understood by those skilled in the art. Depending on the exemplary embodiment, a part or the entirety of the steps and/or operations may be implemented or performed by using commands stored in one or more non-temporary computer-readable media, a program, an interactive data structure, and one or more processors driving a client and/or a server. One or more non-temporary computer-readable media are, for example, software, firmware, hardware, and/or any combination thereof. Further, the function of "module" discussed in the present specification may be implemented by software, firmware, hardware, and/or any combination thereof.

One or more non-transitory computer-readable media and/or means for implementing/performing one or more operations/steps/modules of the exemplary embodiments of the present invention may include controllers including Application-Specific Integrated Circuits (ASICs), standard integrated circuits, and micro-controllers performing appropriate commands, and/or an embedded controller, Field-Programmable Gate Arrays (FPGAs), Complex Programmable Logic Devices (CPLDs), and the equivalent devices thereof, but the present invention is not limited thereto.

In the meantime, the foregoing contents of the present invention are merely the particular exemplary embodiments for implementing the invention. The present invention will include not only concrete and practically usable means, but also technical ideas, which are abstract and conceptual ideas that can be utilized as technologies in the future.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A monitoring apparatus for monitoring a task execution time, the monitoring apparatus comprising:
   a setting device configured to output setting information for setting a storage location, a size of a memory structure, or a number of memory structures, wherein task operation information is to be stored in each of a plurality of nodes at the storage location, and wherein the each of the plurality nodes comprises a time synchronizing device, a measuring device, a storing device and an output device; and
   a task monitor configured to output a task operation information request signal to the each of the plurality of nodes, and to receive the task operation information from the each of the plurality of nodes,
   wherein the task operation information includes a start time and an end time of a task measured at a corresponding node in the plurality of nodes, and wherein the start time and the end time include a synchronization time and a local time, respectively, and
   wherein the setting information includes protocol version information, magic byte information, data length information, Cyclic Redundancy Check (CRC) information, and setting data, and wherein the setting data includes storage location information, maximum storage size information, maximum storage number information, and preliminary information.

2. The monitoring apparatus of claim 1, wherein the synchronization time is output from the time synchronizing device for checking a synchronization operation of tasks of different nodes.

3. The monitoring apparatus of claim 1, wherein the local time is an operation time after the corresponding node is booted.

4. The monitoring apparatus of claim 1, wherein the storage location is set to any one of a volatile memory and a non-volatile memory.

5. The monitoring apparatus of claim 1, wherein the task monitor calculates the task execution time based on the task operation information received from the each of the plurality of nodes and outputs the task execution time on a screen.

6. A method of operating a node in a task execution monitoring system, the method comprising:
   receiving setting information from a monitoring apparatus;
   collecting task operation information;
   determining whether a size of the task operation information is larger than a first reference value of the setting information;
   when the size of the task operation information is larger than the first reference value, determining whether a number of the task operation information is greater than a second reference value of the setting information;
   when the number of the task operation information is less than or equal to the second reference value, newly generating the task operation information; and
   storing the task operation information at a storage location of the setting information,
   wherein the task operation information includes a start time and an end time of a task measured at a corresponding node, and wherein the start time and the end time include a synchronization time and a local time, respectively,
   wherein the setting information includes protocol version information, magic byte information, data length information, Cyclic Redundancy Check (CRC) information, and setting data, and wherein the setting data includes storage location information, maximum storage size information, maximum storage number information, and preliminary information, and
   wherein the monitoring apparatus comprises:
   a setting device configured to output setting information for setting a storage location, a size of a memory structure, or a number of memory structures, wherein task operation information is to be stored in each of a plurality of nodes at the storage location, and wherein the each of the plurality nodes comprises a time synchronizing device, a measuring device, a storing device and an output device; and a task monitor configured to output a task operation information request signal to the each of the plurality of nodes, and to receive the task operation information from the each of the plurality of nodes.

7. The method of claim 6, further comprising:

when the size of the task operation information is smaller than or equal to the first reference value, storing the task operation information at the storage location.

8. The method of claim 6, further comprising:

when the number of the task operation information is greater than the second reference value, deleting old task operation information.

9. A method of operating a node in a task execution monitoring system, the method comprising:

initializing a monitoring apparatus and a communication channel;

receiving setting data from the monitoring apparatus;

determining whether the setting data is valid;

when the setting data is valid, determining whether first setting data stored in a storing device is same as the setting data;

when the first setting data stored in the storing device is different from the setting data, updating the first setting data in the storing device with the setting data; and updating the setting data of the node, wherein the setting data includes storage location information, size information about task operation information, and information on a number of task operation information, wherein the determining whether the setting data is valid includes checking validity of the setting data by using protocol version information, magic byte information, data length information, and Cyclic Redundancy Check (CRC) information of a header of the setting data, and wherein the monitoring apparatus comprises:

a setting device configured to output setting information for setting a storage location, a size of a memory structure, or a number of memory structures, wherein task operation information is to be stored in each of a plurality of nodes at the storage location, and wherein the each of the plurality nodes comprises a time synchronizing device, a measuring device, a storing device and an output device; and a task monitor configured to output a task operation information request signal to the each of the plurality of nodes, and to receive the task operation information from the each of the plurality of nodes.

10. The method of claim 9, further comprising:

waiting for reception of the setting data.

11. The method of claim 10, further comprising, wherein when the setting data is invalid, entering into an operation of the waiting for the reception of the setting data.

12. The method of claim 9, further comprising:

when the first setting data stored in the storing device is identical to the setting data, stopping the updating of the setting data.

\* \* \* \* \*